(12) United States Patent
Doostnejad

(10) Patent No.: US 12,713,337 B2
(45) Date of Patent: Aug. 18, 2026

(54) WI-FI RAN SLICING FOR LATENCY SENSITIVE APPLICATIONS

(71) Applicant: Intel Corporation, Santa Clara, CA (US)

(72) Inventor: Roya Doostnejad, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/127,724

(22) Filed: Mar. 29, 2023

(65) Prior Publication Data

US 2023/0239778 A1 Jul. 27, 2023

(51) Int. Cl.
*H04W 48/18* (2009.01)
*H04L 27/26* (2006.01)

(52) U.S. Cl.
CPC ....... *H04W 48/18* (2013.01); *H04L 27/26025* (2021.01)

(58) Field of Classification Search
None
See application file for complete search history.

(56) References Cited

U.S. PATENT DOCUMENTS

2024/0114382 A1* 4/2024 Bahl .................. H04J 14/0257

* cited by examiner

*Primary Examiner* — Suhail Khan
(74) *Attorney, Agent, or Firm* — Schwegman Lundberg & Woessner, P.A.

(57) ABSTRACT

Methods, apparatuses, and computer readable media for communicating data between an access point (AP) and station (STA) are disclosed. When data is to be communicated between the AP and STA using Wi-Fi, a radio access network (RAN) slice is select for transmission of data from among different RAN slices associated with resource units (RUs) associated with different subcarrier spacings (SCS). The SCS is dependent on a quality of service (QoS) profile of the data to be communicated. RUs associated with different SCS are segregated by RAN slice and have different RU architectures. Each architecture has a different combination of time and frequency resource. The SCS may be dependent on a frequency band used for the communication. The different SCSs include at least a high throughput, SCS and a low latency SCS. A physical layer protocol data unit (PPDU) contains data of different STAs and of different SCSs multiplexed using orthogonal frequency-division multiple access (OFDMA).

20 Claims, 10 Drawing Sheets

WI-FI RAN SLICING FOR LATENCY SENSITIVE APPLICATIONS

TECHNICAL FIELD

Embodiments relate to devices operating in accordance with wireless local area networks (WLANs) and Wi-Fi networks including networks operating in accordance with different versions or generations of the IEEE 802.11 family of standards. Some embodiments relate to the Wi-Fi transmission of data for latency-sensitive applications.

BACKGROUND

Efficient resource use may promote effective bandwidth and times to users of the network. However, often there are acceptable many devices trying to share the same resources and some devices may be limited by the communication protocol they use or by their hardware bandwidth. Moreover, wireless devices may operate with both newer protocols and with legacy device protocols. Enablement of low latency applications in Wi-Fi communications has been always a challenge. One objective of next generation wireless connectivity is to provide simultaneous support both high throughput and low-latency transmissions.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
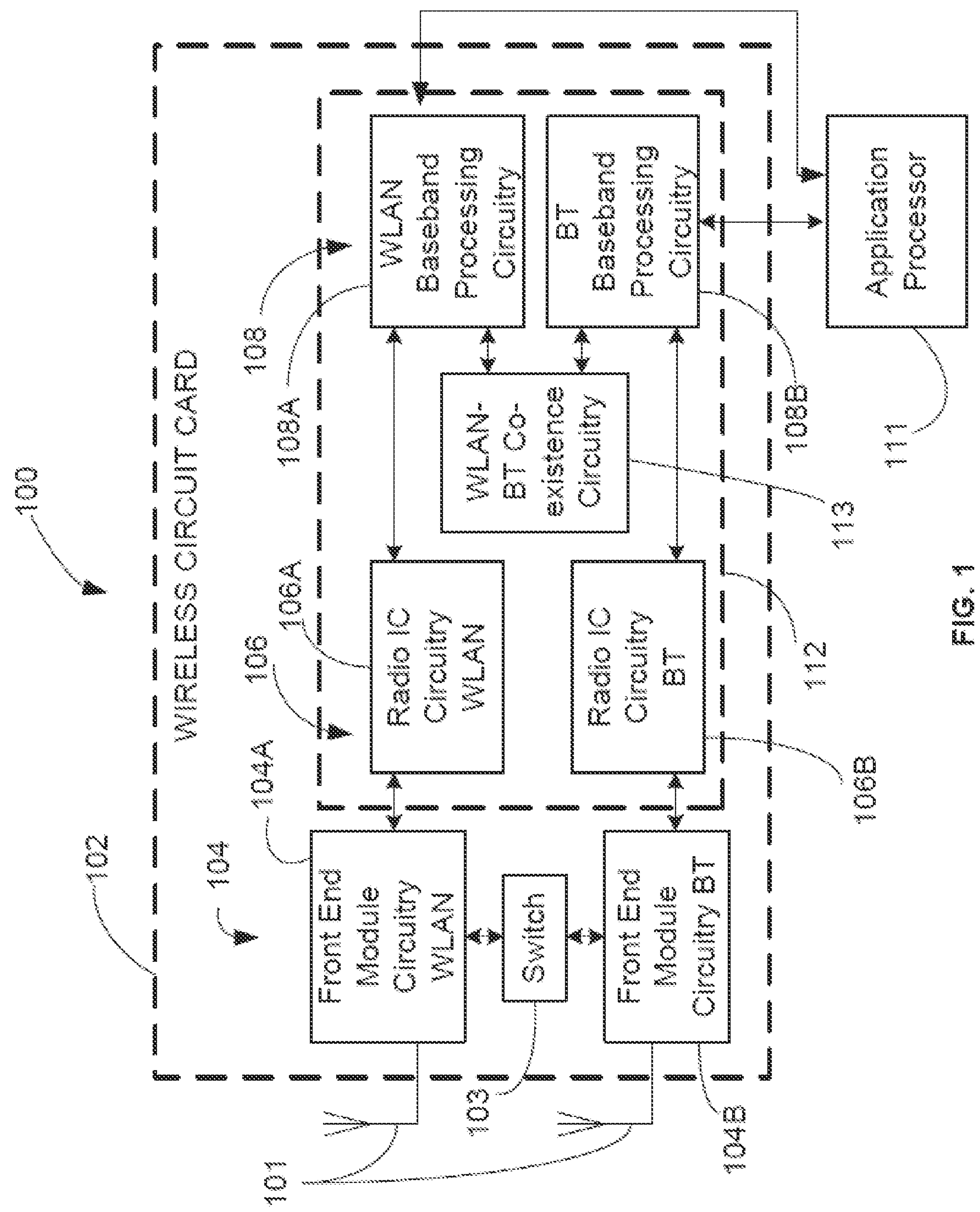
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
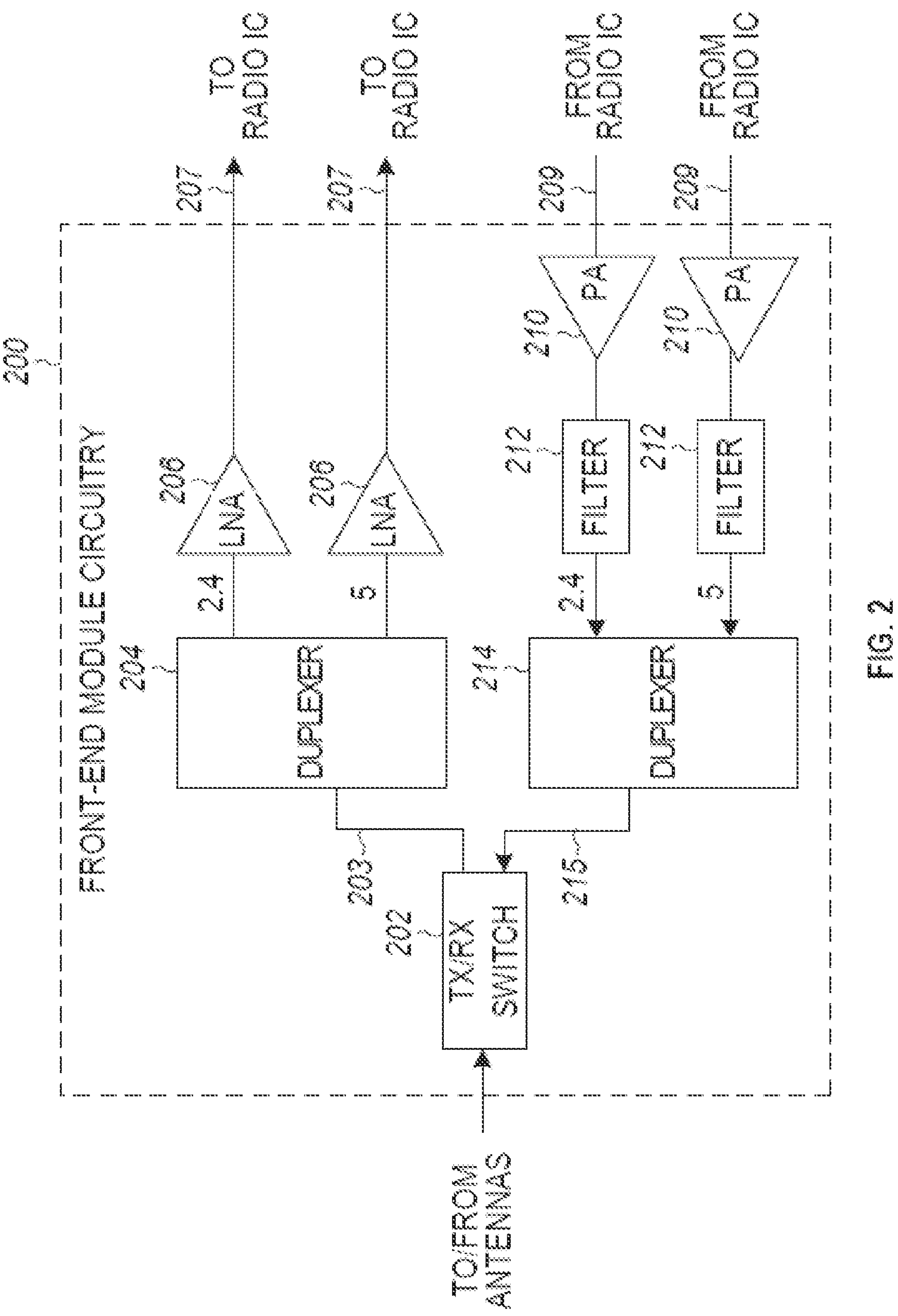
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
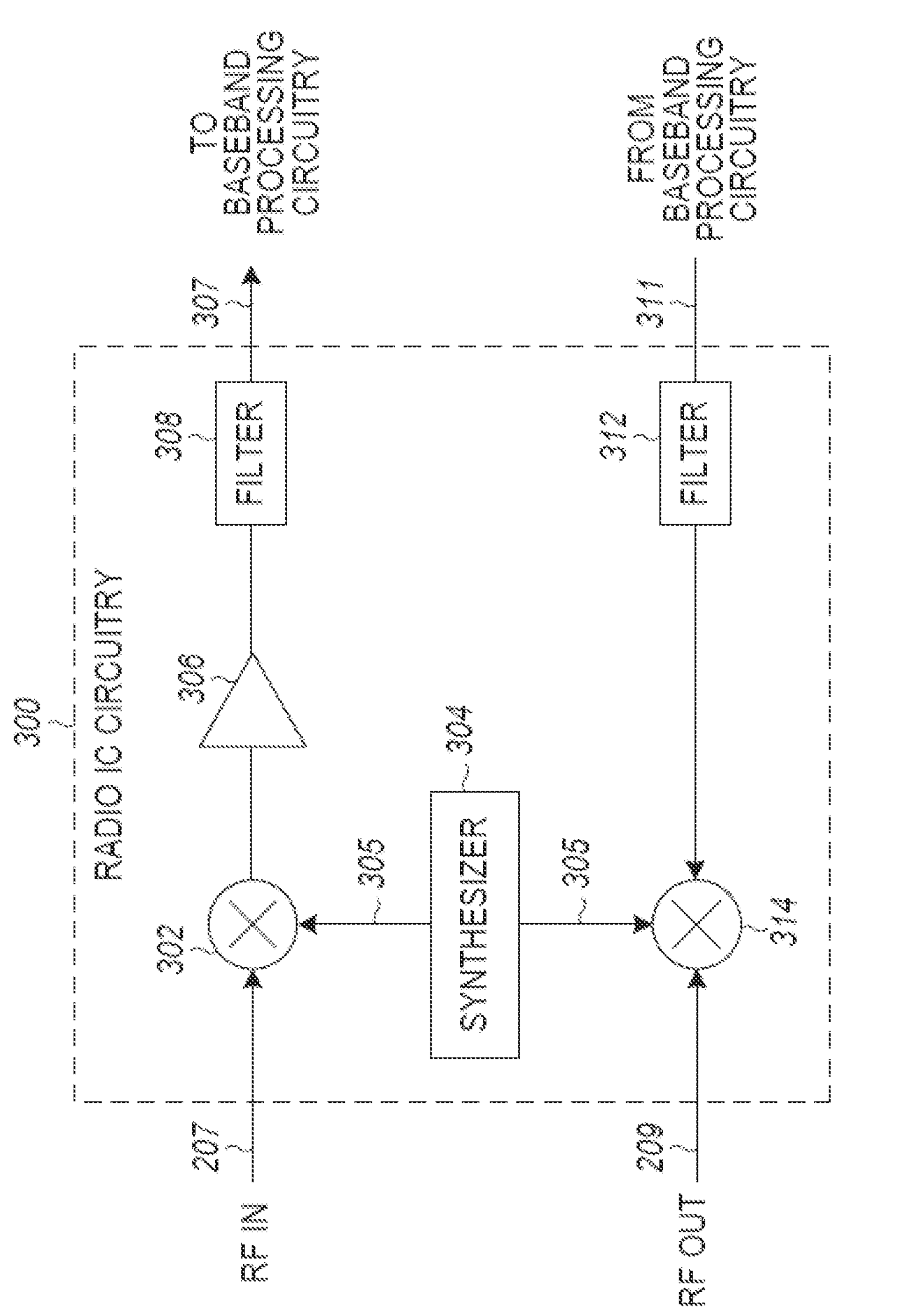
FIG. 3 illustrates a radio IC circuitry for use in the radio architecture of FIG. 1 in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLo) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLo).

Figure 4:
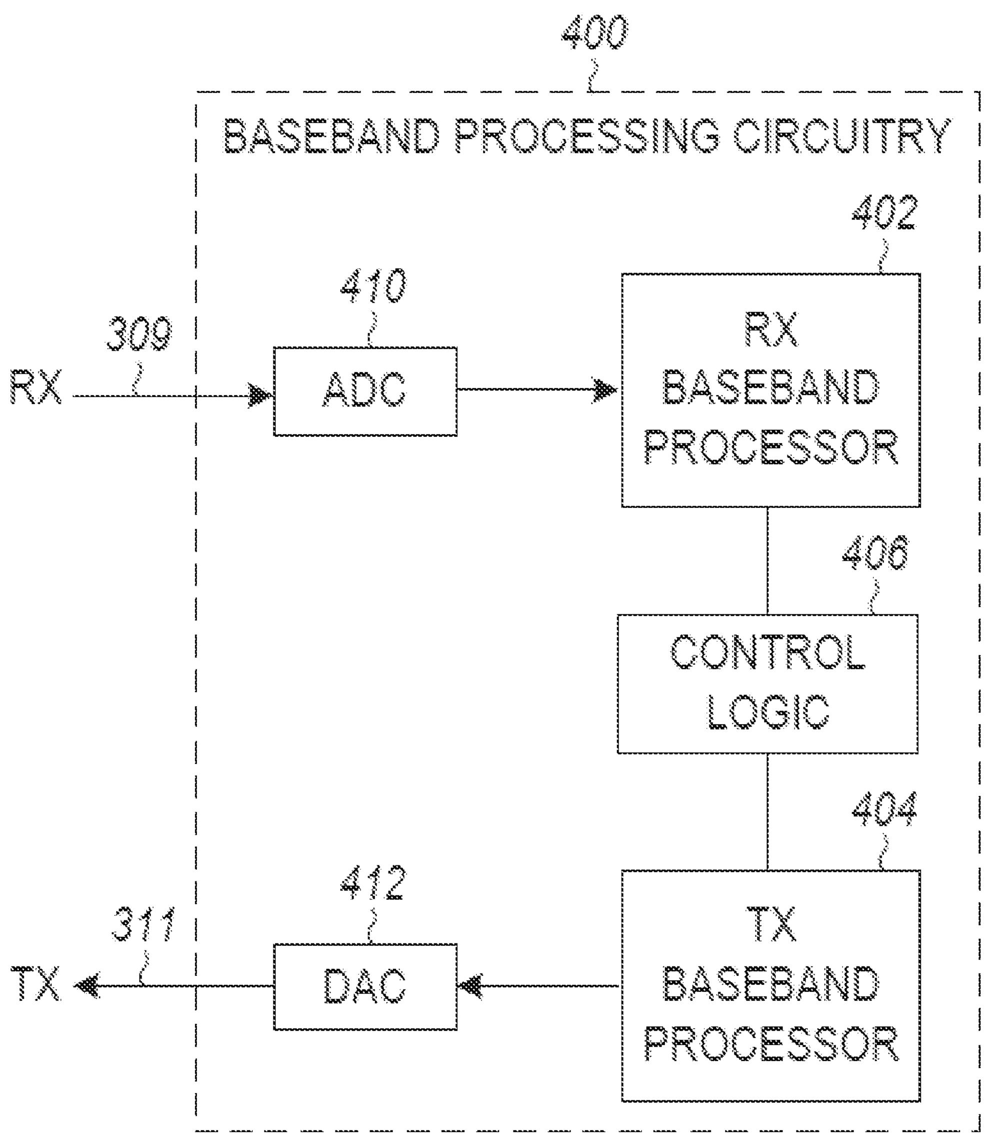
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
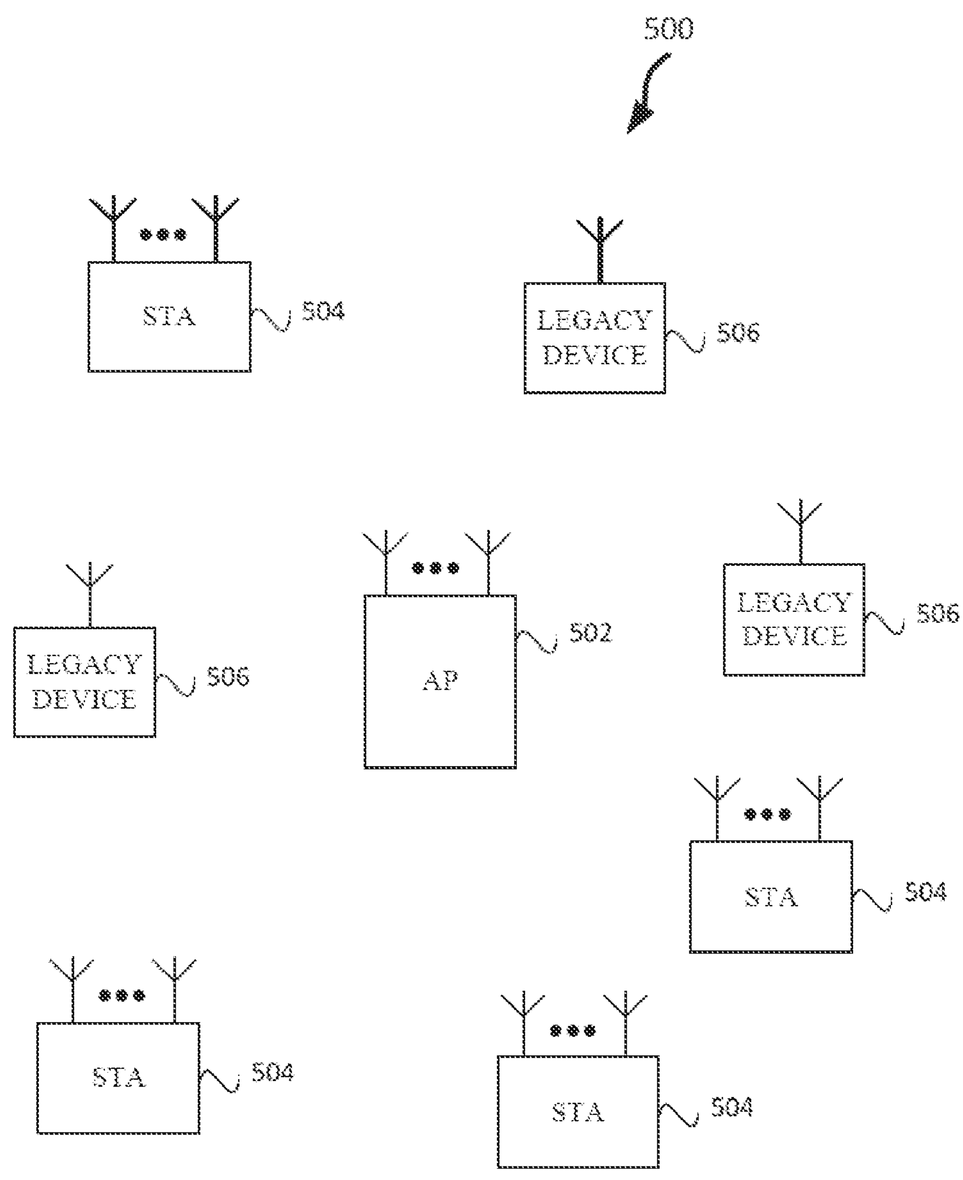
FIG. 5 illustrates a WLAN in accordance with some embodiments.

FIG. 5 illustrates a WLAN 500 in accordance with some embodiments. The WLAN 500 may comprise a basis service set (BSS) that may include an access point (AP) 502, a plurality of stations (STAs) 504, and a plurality of legacy devices 506. In some embodiments, the STAs 504 and/or AP 502 are configured to operate in accordance with IEEE 802.11be extremely high throughput (EHT) and/or high efficiency (HE) IEEE 802.11ax. In some embodiments, the STAs 504 and/or AP 520 are configured to operate in accordance with IEEE 802.11az. In some embodiments, IEEE 802.11EHT may be termed Next Generation 802.11. The STA 504 and AP 502 (or apparatuses of) may be configured to operate in accordance with IEEE P802.11be™/D1.2, September 2021, IEEE P802.11ax™/

D8.0, October 2020, and/or IEEE Std 802.11™-2020, which are incorporated herein by reference in their entirety.

The AP 502 may be an AP using the IEEE 802.11 to transmit and receive. The AP 502 may be a base station. The AP 502 may use other communications protocols as well as the IEEE 802.11 protocol. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one APs 502 and may control more than one BSS, e.g., assign primary channels, colors, etc. AP 502 may be connected to the internet.

The legacy devices 506 may operate in accordance with one or more of IEEE 802.11 a/b/g/n/ac/ad/af/ah/aj/ay/ax, or another legacy wireless communication standard. The legacy devices 506 may be STAs or IEEE STAs. The STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11be or another wireless protocol.

The AP 502 may communicate with legacy devices 506 in accordance with legacy IEEE 802.11 communication techniques. In example embodiments, the H AP 502 may also be configured to communicate with STAs 504 in accordance with legacy IEEE 802.11 communication techniques.

In some embodiments, a HE or EHT frames may be configurable to have the same bandwidth as a channel. The HE or EHT frame may be a physical Layer Convergence Procedure (PLCP) Protocol Data Unit (PPDU). In some embodiments, PPDU may be an abbreviation for physical layer protocol data unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the AP 502, STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g, IEEE 802.11EHT/ax embodiments, a HE AP 502 may operate as a master station which may be arranged to contend for a wireless medium (e.g., during a contention period) to receive exclusive control of the medium for a transmission opportunity (TXOP). The AP 502 may transmit an EHT/HE trigger frame transmission, which may include a schedule for simultaneous UL/DL transmissions from STAs 504. The AP 502 may transmit a time duration of the TXOP and sub-channel information. During the TXOP, STAs 504 may communicate with the AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the AP 502 may communicate with stations 504 using one or more HE or EHT frames. During the TXOP, the HE STAs 504 may operate on a sub-channel smaller than the operating range of the AP 502. During the TXOP, legacy stations refrain from communicating. The legacy stations may need to receive the communication from the HE AP 502 to defer from communicating.

In accordance with some embodiments, during the TXOP the STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The AP 502 may also communicate with legacy stations 506 and/or STAs 504 in accordance with legacy IEEE 802.11 communication techniques. In some embodiments, the AP 502 may also be configurable to communicate with STAs 504 outside the TXOP in accordance with legacy IEEE 802.11 or IEEE 802.11EHT/ax communication techniques, although this is not a requirement.

In some embodiments the STA 504 may be a "group owner" (GO) for peer-to-peer modes of operation. A wireless device may be a STA 502 or a HE AP 502.

In some embodiments, the STA 504 and/or AP 502 may be configured to operate in accordance with IEEE 802.11mc. In example embodiments, the radio architecture of FIG. 1 is configured to implement the STA 504 and/or the AP 502. In example embodiments, the front-end module circuitry of FIG. 2 is configured to implement the STA 504 and/or the AP 502. In example embodiments, the radio IC circuitry of FIG. 3 is configured to implement the HE station 504 and/or the AP 502. In example embodiments, the base-band processing circuitry of FIG. 4 is configured to implement the STA 504 and/or the AP 502.

In example embodiments, the STAs 504, AP 502, an apparatus of the STA 504, and/or an apparatus of the AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-23.

In example embodiments, the STAs 504 and/or the HE AP 502 are configured to perform the methods and operations/functions described herein in conjunction with FIGS. 1-23. In example embodiments, an apparatus of the STA 504 and/or an apparatus of the AP 502 are configured to perform the methods and functions described herein in conjunction with FIGS. 1-23. The term Wi-Fi may refer to one or more of the IEEE 802.11 communication standards. AP and STA may refer to EHT/HE access point and/or EHT/HE station as well as legacy devices 506.

In some embodiments, a HE AP STA may refer to a AP 502 and/or STAs 504 that are operating as EHT APs 502. In some embodiments, when a STA 504 is not operating as an AP, it may be referred to as a non-AP STA or non-AP. In some embodiments, STA 504 may be referred to as either an AP STA or a non-AP.

Figure 6:
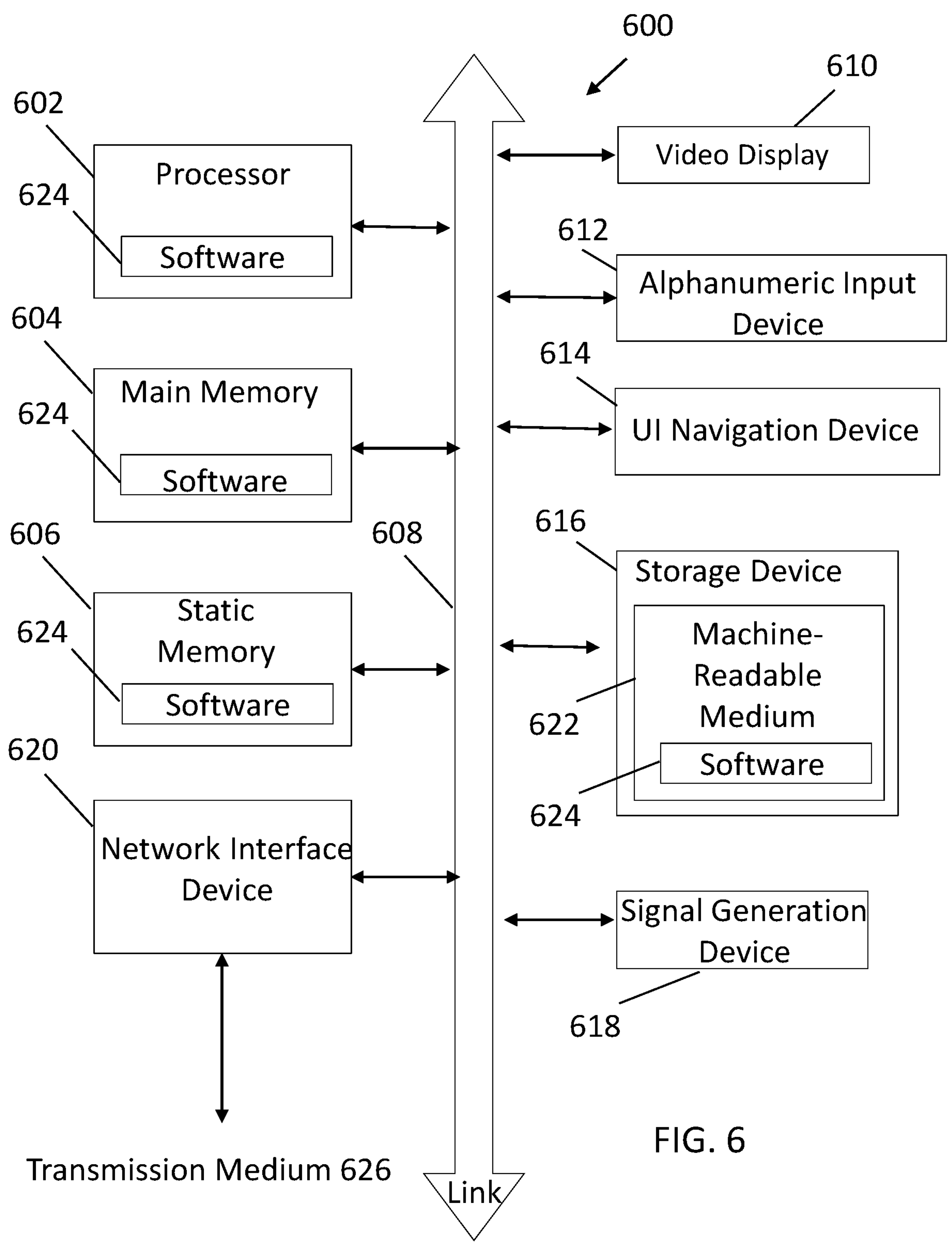
FIG. 6 illustrates a block diagram of an example machine upon which any one or more of the techniques (e.g., methodologies) discussed herein may perform in accordance with some embodiments.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, EVT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
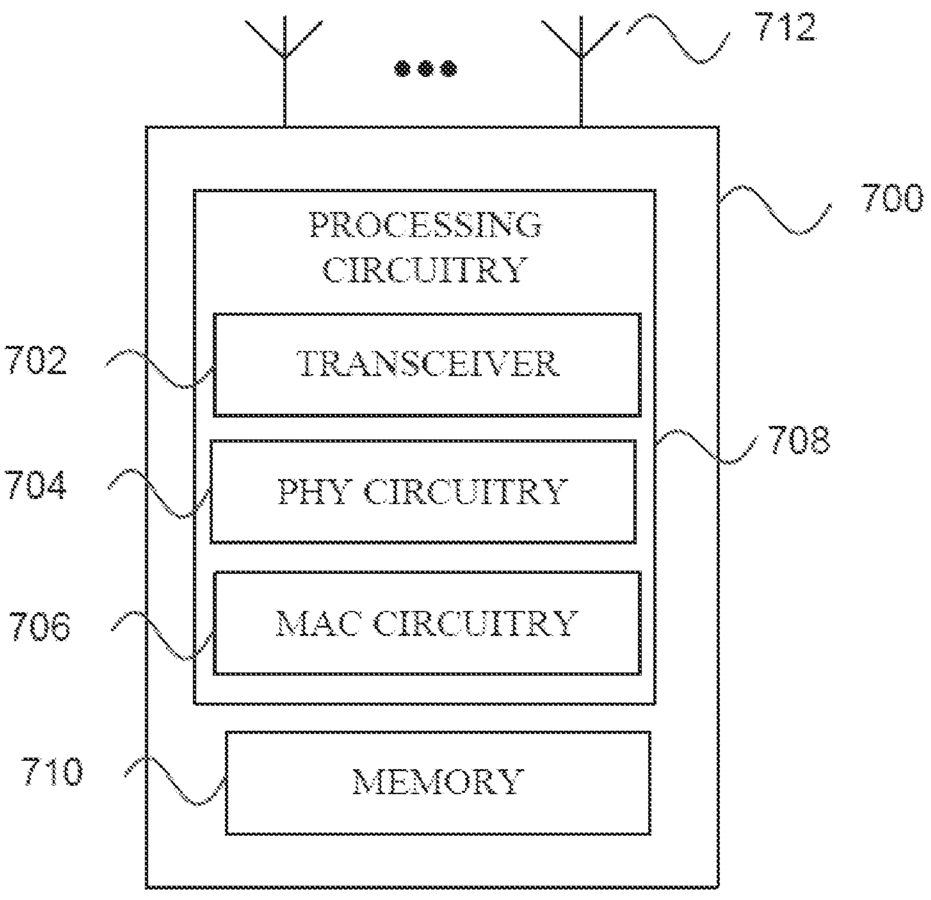
FIG. 7 illustrates a block diagram of an example wireless device upon which any one or more of the techniques (e.g., methodologies or operations) discussed herein may perform in accordance with some embodiments.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a HE STA 504, HE AP 502, and/or a HE STA or HE AP. AHE STA 504, HE AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver

702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

As above, it is desirable to enable use cases of low latency and high throughput to be simultaneously supported on a common Wi-Fi infrastructure while performance impact is minimized. In some cases, network slicing may be used to provide priority to low latency applications. In addition, restricted target wake time (TWT), introduced in IEEE 802.11be, enables an access point to allocate exclusive access to the medium at specified time. In each of these cases, however full system support does not exist for low latency in terms of physical layer parameters and waveforms. Although the network may prioritize sensitive traffic, a fixed latency remains associated with a large packet size. In addition, high throughput traffic which uses a continuous long TXOP is restricted for accommodating low latency traffic. Accordingly, previous architectures do not optimally support both applications simultaneously.

To overcome these issues, defining multiple numerologies may be introduced in IEEE 802.11 to support multiple applications with different quality of service (QoS) requirements. In particular, different subcarrier spacing (SCS) may be defined for the different flows, which may result in the use of different symbol lengths. A larger SCS corresponds to a smaller symbol time, and consequently lower latency. A RAN slicing architecture may be used to configure RAN level resources among the slices. This may be applied to both the sub-6 GHz and the 60 GHz bands. Allowing different slices to be configured with different time slot durations may enable slicing to guarantee multiple QoS requirements at the RAN level, which may be useful for latency-sensitive applications as the RAN accounts for a large part of the end-to-end service latency. In particular, by allowing higher SCS, a particular slice may be configured with a shorter time slot duration to support low latency applications while another slice can use a smaller SCS to support higher throughput applications.

Network slicing enables creation of different logical network instances over a common network infrastructure. Each instance is tailored for specific QoS profiles so that network can simultaneously support use cases with diverse requirements. Network slicing is seen as a foundational 5G capability and can be applied at the core network or at the RAN. RAN slicing is particularly relevant to support latency-sensitive or time critical applications since the RAN accounts for a significant part of the end-to-end transmission latency. A network slice includes a set of computing resources assigned to a tenant of the network to provide a specific service. Tenants may be mobile network operators themselves providing mobile services to subscribers, or third-party verticals such as Internet of Things (IoT) service providers to offer connectivity to smart meters, smart factories, intelligent transportation systems, air quality sensors in the smart cities, etc.

In cellular network slicing, a single physical network generalizes corresponding network topology and functions through virtualization based on a unified physical infrastructure, generating a network slice for each vertical/service type. Such network slicing enables multiple logical networks to be constructed on a single physical network (including RAN, edge, transport, and core network) by using software defined network (SDN) and Network Function Virtualization (NFV) technologies to address the diverse vertical application requirements. The radio resource isolation can be on various levels/granularities ranging from the smallest granularity, resource block isolation to carrier-level isolation. At the core network, different users can be hosted on different slices depending upon one or more services per their demand. Furthermore, the network functions (NFs) at the core may be specific to a slice (slice-specific NFs) or shared among multiple slices (common NFs). In this way, SDN technologies separate the control plane and user plane in a network and extend the network programmability via open interfaces to realize fully configurable and scalable network slices. The different network components and resources that are involved in the life cycle of each network slice can be coordinated and managed through orchestration. NFV provides an abstract representation of the physical resources needed for NFs, decouples each NF instance from the hardware the NF instance runs on and enables highly scalable slice deployment on demand. Network slicing enables differentiated pricing for different services and customers.

In addition to 5G and subsequent generation networks, the Wi-Fi landscape has been rapidly expanding to cover different demanding use cases such as new metaverse applications, interactive gaming, augmented reality/virtual reality (AR/VR) applications, and mission critical industry use cases. One challenge for Wi-Fi is to support low latency applications while maintaining the performance for high throughput traffic.

To this end, RAN slicing for Wi-Fi may be used in aspects in which different subcarrier spacing is allowed for different applications or different slices. In 4G cellular and Wi-Fi technologies, SCS (and as a result symbol time duration) is fixed. 5G NR introduces the concept of multiple numerologies, which uses specific physical layer configurations, allows different SCS of [15, 30, 60, 120, 240] (KHz) which respectively correspond to time slot durations of [1, 0.5, 0.25, 0.125, 0.0625] (msec). This numerology enables more efficient sharing of the spectrum among the heterogeneous services in 5G RAN and hence among slices. In specific the larger SCS which results smaller time slot duration guarantees lower end to end latency.

Figure 8:
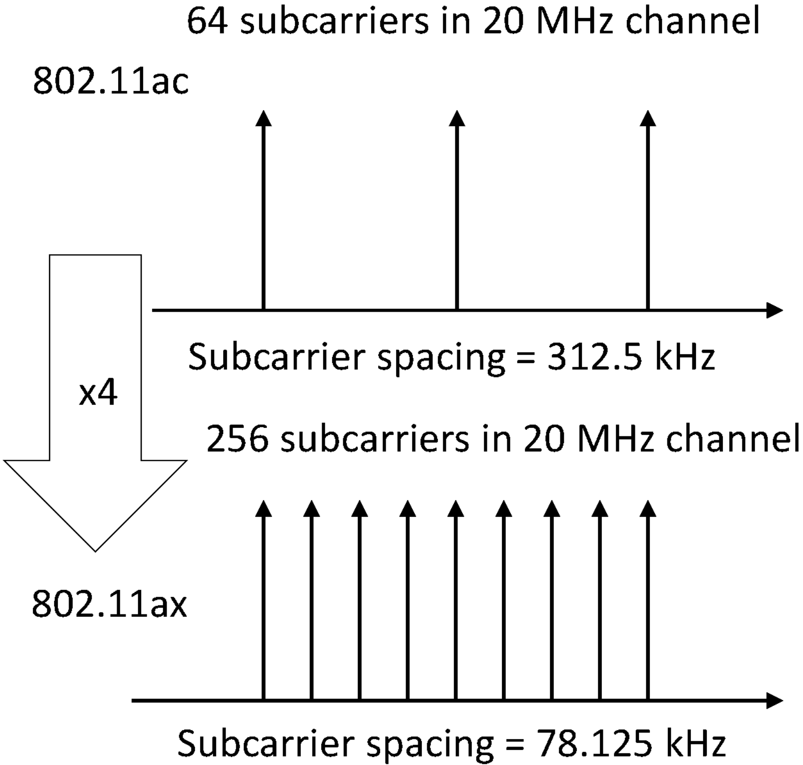
FIG. 8 illustrates Subcarrier Spacing (SCS) in Wi-Fi 5 (802.11ac) vs Wi-Fi6 (802.11ax) in accordance with some embodiments.
Figure 9A:
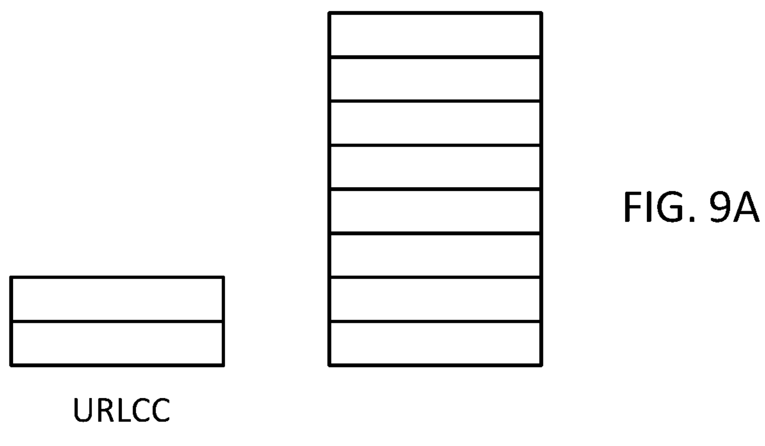
FIG. 9A illustrates fixed SCS in accordance with some embodiments.

In Wi-Fi 6 and Wi-Fi 7 (802.11ax and 802.11be), SCS is fixed. In fact, the SCS used is one fourth of the SCS in Wi-Fi 5 (802.11ac) to support a larger number of devices and higher throughput. FIG. 8 illustrates SCS in Wi-Fi5 (802.11ac) vs Wi-Fi6 (802.11ax) in accordance with some embodiments. This has led to a spectral spacing of 78.125 kHz between subcarriers, as opposed to an SCS of 312.5 KHz in Wi-Fi 5. The symbol duration, which is inversely proportional to carrier spacing, thus is four times that of Wi-Fi 5, increasing from 3.2 μs in 802.11ac to 12.8 μs in 802.11ax and 802.11be. This smaller SCS satisfies the demand for an increased number of devices as the smaller SCS provides finer RU granularity and improves the efficiency of data transmission by increasing the number of data subcarriers. However, such an increase is in opposition to lower latency requirements because of the larger symbol time. Even prioritization of time-sensitive applications through Wi-Fi slicing is unable to meet the requirement for low end-to-end latency. FIG. 9A illustrates fixed SCS in accordance with some embodiments.

Figure 9B:
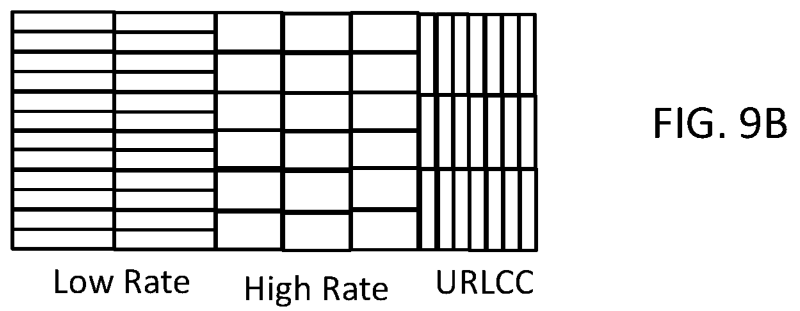
FIG. 9B illustrates variable SCS in accordance with some embodiments.

Thus, multiple numerologies may be defined for (uplink and/or downlink) WLAN (specifically Wi-Fi) communications between an AP and a STA. In this case, RAN slicing may be enabled to configure resources at the RAN level. Slices may be defined to serve applications with a particular QoS profile. Thus, rather than the RAN slicing being designed to satisfy rate demands, the RAN slicing may be designed to support low latency cases as well. FIG. 9B illustrates variable SCS in accordance with some embodiments.

The variable sub carrier spacing may be defined in a various ways. In one example for sub-6 GHz frequencies, two SCS of [78.125, 312.5] KHz may be defined, where the larger SCS may be applied for low latency applications. In another example, an SCS of 312.5 KHz may be limited to being used only for the 6 GHz band. In another example, more than two SCS may be defined across each of the bands (e.g., 2.5/5/6 GHz bands); alternatively, each SCS may be defined for use in a specific band. In another example, the 60 GHz frequency band and millimeter wave numerology may be included where an additional SCS of 2.5 MHz corresponding to a symbol time of 0.4 micro seconds is defined. The different SCS may correspond to different resource unit architecture (combinations of frequency and time). Thus, the time dimension is larger for the resource unit for data transmitted with lower SCS, and the frequency dimension is larger for the resource unit for data transmitted with higher SCS.

In one embodiment, each physical layer protocol data unit (PPDU) contains a single type of numerology (SCS). For example, low latency devices using a SCS of 312.5 KHz may be multiplexed in orthogonal frequency-division multiple access (OFDMA) fashion in a single PPDU and high throughput data may be multiplexed in another PPDU using a SCS of 78.125 KHz. In this case, end-to-end latency of the former case (4 times SCS) is reduced by almost a factor of 3.

In another embodiment, data from both categories, lower SCS and higher SCS, may be multiplexed in the same PPDU. In this case, the multiplexing may be enabled by defining an RU in time and frequency dimensions as shown in FIG. 9B. This may allow integration of several low latency transmissions with high data rate applications in the same PPDU. One PPDU may thus carry traffic of only the same QoS or may carry traffic of different QoS categories; that is, the PPDU may be allocated to a single slice or different slices.

Note that although only two SCS are described above, any number of SCS may be defined as desired. A high throughput, high latency SCS may be used for low priority traffic such as background or IoT data. Another low throughput, low latency SCS may be used for Ultra-Reliable Low Latency Communications (URLLC) traffic, such as that used for AR/VR or in factory settings (e.g., control of robots). Another SCS having a bandwidth between the two above may be used for normal priority traffic, such as that used for data from a user device.

RAN slicing using multiple numerology may be extended to coordinated time division multiple access (Co-TDMA) embodiments, in which multiple APs share time resources during a TXOP, as well as coordinated frequency (Co-OFDM), in which multiple APs share frequency resources during a TXOP. Each AP may be statically or dynamically commissioned by a RAN to a slice with specific QoS requirement. This commissioning may be dependent on, for example, the number and type of devices (and predicted amount/type of data produced) determined or predicted to be served by each AP. RAN slicing may similarly be performed statically or dynamically by the network layer. In this case, Artificial Intelligence (AI) models may be used to implement intelligent dynamic RAN slicing, based on training of similar APs under similar conditions.

Figure 10:
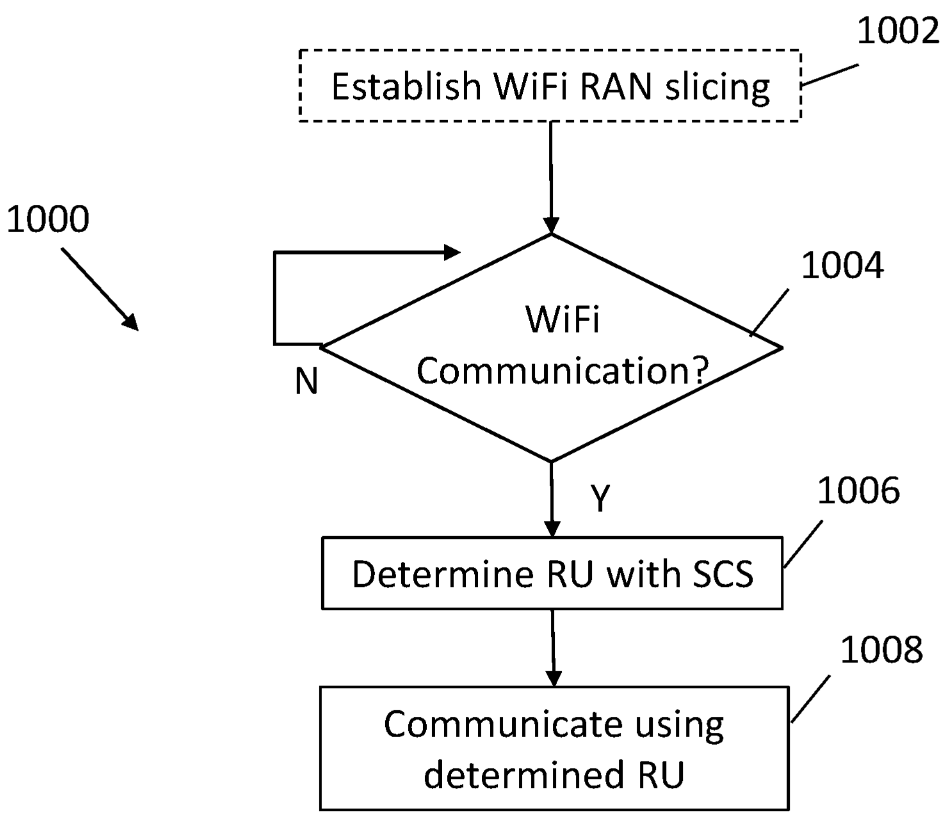
FIG. 10 illustrates a method of RAN slicing, in accordance with some embodiments.

FIG. 10 illustrates a method of RAN slicing, in accordance with some embodiments. The method 1000 of FIG. 10 is merely exemplary; additional operations not shown may be present. At least some of the operations of the method 1000 may be performed by an AP and/or a STA. The method 1000 begins at operation 1002 with establishment of RAN slicing for WLAN or, in specific embodiments, Wi-Fi communications.

At operation 1004, an AP or STA may determine whether WLAN (Wi-Fi) communication is to occur. That is, the device may determine whether uplink or downlink traffic is to be transmitted/received.

At operation 1006, the AP or STA may determine at least one resource unit from RU having different SCS. The SCS may be dependent on a QoS profile of data to be communicated. The RU are segregated into the different SCS by the RAN slicing.

At operation 1008, the AP or STA may communicate using the determined RU.

Thus, in some embodiments, data is transmitted with different SCS (waveform specifications) for each application as each application is assigned to a slice (e.g., low latency) and as a result there are specific SCS for transmitting that data.

EXAMPLES

Example 1 is an apparatus for an access point (AP), the apparatus comprising memory; and processing circuitry coupled to the memory, the processing circuitry to configure the AP to: determine data is to be transmitted to a station (STA); determine, from among multiple radio access network (RAN) slices, a RAN slice for transmission of the data, a subcarrier spacing (SCS) of resource units associated with the RAN slice dependent on a quality of service (QoS) profile of the data, wherein resource units associated with different SCSs are segregated among the RAN slices and have different resource unit architectures; and transmit the data to the STA via Wi-Fi using the RAN slice.

In Example 2, the subject matter of Example 1 includes, wherein an SCS used for transmission of the data is dependent on a frequency band used for the transmission.

In Example 3, the subject matter of Example 2 includes, wherein at least one of a SCS of 78.125 KHz or 312.5 KHz is used for sub-6 GHz frequencies, and the SCS of 312.5 KHz is used for low latency application traffic.

In Example 4, the subject matter of Example 3 includes, wherein a SCS of 2.5 MHz is used for a 60 GHz frequency band.

In Example 5, the subject matter of Examples 2-4 includes, wherein SCS selection is limited to a SCS of 312.5 KHz for a 6 GHz frequency band.

In Example 6, the subject matter of Examples 2-5 includes, wherein SCS selection is limited to a single SCS in each frequency band.

In Example 7, the subject matter of Examples 1-6 includes, wherein the processing circuitry configures the AP to multiplex, using orthogonal frequency-division multiple access (OFDMA), data of multiple STAs into a physical layer protocol data unit (PPDU) that contains data of a single SCS.

In Example 8, the subject matter of Examples 1-7 includes, wherein the processing circuitry configures the AP to multiplex, using orthogonal frequency-division multiple access (OFDMA), data of multiple STAs into a physical layer protocol data unit (PPDU) that contains data of different SCSs.

In Example 9, the subject matter of Examples 1-8 includes, wherein the different SCSs include a high throughput SCS for high data rate traffic, a low latency SCS for Ultra-Reliable Low Latency Communications (URLLC) traffic, and an intermediate SCS for background traffic.

In Example 10, the subject matter of Examples 1-9 includes, wherein: the RAN slicing is used for a coordinated set comprising at least one of coordinated time division multiple access (Co-TDMA), in which the AP shares time resources with at least one other AP during a transmission opportunity (TXOP), or coordinated frequency (Co-OFDM), in which the AP shares frequency resources with the at least one other AP during the TXOP, and multiple APs in the coordinated set are statically or dynamically commissioned to a slice with a specific QoS requirement.

Example 11 is an apparatus for a station (STA), the apparatus comprising memory; and processing circuitry coupled to the memory, the processing circuitry to configure the STA to: select a radio access network (RAN) slice, for transmission of data, among different RAN slices associated with resource units, wherein the resource units of the different RAN slices are associated with different subcarrier spacings (SCS) that are segregated among the RAN slices and have different resource unit architectures, wherein the SCS is dependent on a quality of service (QoS) profile of the data, and wherein each resource unit architecture has a different combination of time and frequency resources; and transmit the data to an access point (AP) via Wi-Fi using the RAN slice.

In Example 12, the subject matter of Example 11 includes, wherein an SCS used for transmission to the AP is dependent on a frequency band used for the transmission.

In Example 13, the subject matter of Example 12 includes, wherein at least one of a SCS of 78.125 KHz or 312.5 KHz is used for sub-6 GHz frequencies, and the SCS of 312.5 KHz is used for data communication of low latency applications.

In Example 14, the subject matter of Example 13 includes, wherein a SCS of 2.5 MHz is used for a 60 GHz frequency band.

In Example 15, the subject matter of Examples 12-14 includes, wherein SCS selection is limited to a SCS of 312.5 KHz for 6 GHz frequencies.

In Example 16, the subject matter of Examples 12-15 includes, wherein SCS selection is limited to a single SCS in each frequency band.

In Example 17, the subject matter of Examples 11-16 includes, wherein the RAN slicing is performed statically or dynamically by a network layer.

Example 18 is a non-transitory computer-readable storage medium that stores instructions for execution by one or more processors of an apparatus for an access point (AP), the instructions to configure the one or more processors to: select a radio access network (RAN) slice, for transmission of data, among different RAN slices associated with resource units, wherein the resource units of the different RAN slices are associated with different subcarrier spacings (SCS) that are segregated among the RAN slices and have different resource unit architectures, wherein the SCS is dependent on a quality of service (QoS) profile of the data, and wherein each resource unit architecture has a different combination of time and frequency resources; and transmit data to a station (STA) via Wi-Fi using the at least one resource unit.

In Example 19, the subject matter of Example 18 includes, wherein an SCS used for transmission to the STA is dependent on a frequency band used for the transmission.

In Example 20, the subject matter of Examples 18-19 includes, wherein the instructions to configure the one or more processors to multiplex, using orthogonal frequency-division multiple access (OFDMA), data of multiple STAs into a physical layer protocol data unit (PPDU) that contains data of different SCSs.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for an access point (AP), the apparatus comprising memory; and processing circuitry coupled to the memory, the processing circuitry to configure the AP to:
determine data is to be transmitted to a station (STA);
determine, from among multiple radio access network (RAN) slices, a RAN slice for transmission of the data, a subcarrier spacing (SCS) of resource units associated with the RAN slice dependent on a quality of service (QoS) profile of the data, wherein resource units associated with different SCSs are segregated among the RAN slices and have different resource unit architectures; and
transmit the data to the STA via Wi-Fi using the RAN slice.

2. The apparatus of claim 1, wherein an SCS used for transmission of the data is dependent on a frequency band used for the transmission.

3. The apparatus of claim 2, wherein at least one of a SCS of 78.125 KHz or 312.5 KHz is used for sub-6 GHz frequencies, and the SCS of 312.5 KHz is used for low latency application traffic.

4. The apparatus of claim 3, wherein a SCS of 2.5 MHz is used for a 60 GHz frequency band.

5. The apparatus of claim 2, wherein SCS selection is limited to a SCS of 312.5 KHz for a 6 GHz frequency band.

6. The apparatus of claim 2, wherein SCS selection is limited to a single SCS in each frequency band.

7. The apparatus of claim 1, wherein the processing circuitry configures the AP to multiplex, using orthogonal frequency-division multiple access (OFDMA), data of multiple STAs into a physical layer protocol data unit (PPDU) that contains data of a single SCS.

8. The apparatus of claim 1, wherein the processing circuitry configures the AP to multiplex, using orthogonal frequency-division multiple access (OFDMA), data of multiple STAs into a physical layer protocol data unit (PPDU) that contains data of different SCSs.

9. The apparatus of claim 1, wherein the different SCSs include a high throughput SCS for high data rate traffic, a low latency SCS for Ultra-Reliable Low Latency Communications (URLLC) traffic, and an intermediate SCS for background traffic.

10. The apparatus of claim 1, wherein:
the RAN slicing is used for a coordinated set comprising at least one of coordinated time division multiple access (Co-TDMA), in which the AP shares time resources with at least one other AP during a transmission opportunity (TXOP), or coordinated frequency (Co-OFDM), in which the AP shares frequency resources with the at least one other AP during the TXOP, and
multiple APs in the coordinated set are statically or dynamically commissioned to a slice with a specific QoS requirement.

11. An apparatus for a station (STA), the apparatus comprising memory; and processing circuitry coupled to the memory, the processing circuitry to configure the STA to:
select a radio access network (RAN) slice, for transmission of data, among different RAN slices associated with resource units, wherein the resource units of the different RAN slices are associated with different subcarrier spacings (SCS) that are segregated among the RAN slices and have different resource unit architectures, wherein the SCS is dependent on a quality of service (QoS) profile of the data, and wherein each resource unit architecture has a different combination of time and frequency resources; and
transmit the data to an access point (AP) via Wi-Fi using the RAN slice.

12. The apparatus of claim 11, wherein an SCS used for transmission to the AP is dependent on a frequency band used for the transmission.

13. The apparatus of claim 12, wherein at least one of a SCS of 78.125 KHz or 312.5 KHz is used for sub-6 GHz frequencies, and the SCS of 312.5 KHz is used for data communication of low latency applications.

14. The apparatus of claim 13, wherein a SCS of 2.5 MHz is used for a 60 GHz frequency band.

15. The apparatus of claim 12, wherein SCS selection is limited to a SCS of 312.5 KHz for 6 GHz frequencies.

16. The apparatus of claim 12, wherein SCS selection is limited to a single SCS in each frequency band.

17. The apparatus of claim 11, wherein the RAN slicing is performed statically or dynamically by a network layer.

18. A non-transitory computer-readable storage medium that stores instructions for execution by one or more processors of an apparatus for an access point (AP), the instructions to configure the one or more processors to:
select a radio access network (RAN) slice, for transmission of data, among different RAN slices associated with resource units, wherein the resource units of the different RAN slices are associated with different subcarrier spacings (SCS) that are segregated among the RAN slices and have different resource unit architectures, wherein the SCS is dependent on a quality of service (QoS) profile of the data, and wherein each resource unit architecture has a different combination of time and frequency resources; and
transmit data to a station (STA) via Wi-Fi using the at least one resource unit.

19. The medium of claim 18, wherein an SCS used for transmission to the STA is dependent on a frequency band used for the transmission.

20. The medium of claim 18, wherein the instructions to configure the one or more processors to multiplex, using orthogonal frequency-division multiple access (OFDMA), data of multiple STAs into a physical layer protocol data unit (PPDU) that contains data of different SCSs.

* * * * *